United States Patent
Heilman

[11] Patent Number: 6,167,131
[45] Date of Patent: Dec. 26, 2000

[54] RING GENERATOR

[75] Inventor: Randy Thomas Heilman, Palm Bay, Fla.

[73] Assignee: Intersil Corporation, Melbourne, Fla.

[21] Appl. No.: 09/027,257

[22] Filed: Feb. 20, 1998

[51] Int. Cl.[7] ................................................ H04M 3/02
[52] U.S. Cl. ................................. 379/373; 379/377
[58] Field of Search ........................... 379/372, 373, 379/375, 377, 378, 379; 455/401, 402

[56] References Cited

U.S. PATENT DOCUMENTS

| | | | |
|---|---|---|---|
| 3,740,490 | 6/1973 | McAlonie et al. | 379/373 |
| 3,965,307 | 6/1976 | Dimmer | 379/181 |
| 4,158,752 | 6/1979 | Stewart | 455/401 |
| 4,214,131 | 7/1980 | Bush et al. | 379/375 |
| 4,367,376 | 1/1983 | Proctor et al. | 379/375 X |
| 4,447,675 | 5/1984 | Arntsen et al. | 455/401 |
| 4,563,547 | 1/1986 | Booth | 379/342 |
| 4,827,503 | 5/1989 | Takato et al. | 379/373 |
| 5,694,465 | 12/1997 | Apfel | 379/377 |

*Primary Examiner*—David R. Hudspeth
*Assistant Examiner*—Abul K. Azad
*Attorney, Agent, or Firm*—Rogers & Killeen

[57] ABSTRACT

In a local loop telephone system, a voltage limited device having circuitry to provide subscriber interface functions and generate a ring signal. The device comprises four switches in a full bridge drive configuration. An external source provides a constant voltage which converted into an alternating ring voltage by triggering the switches in a specified sequence.

40 Claims, 3 Drawing Sheets

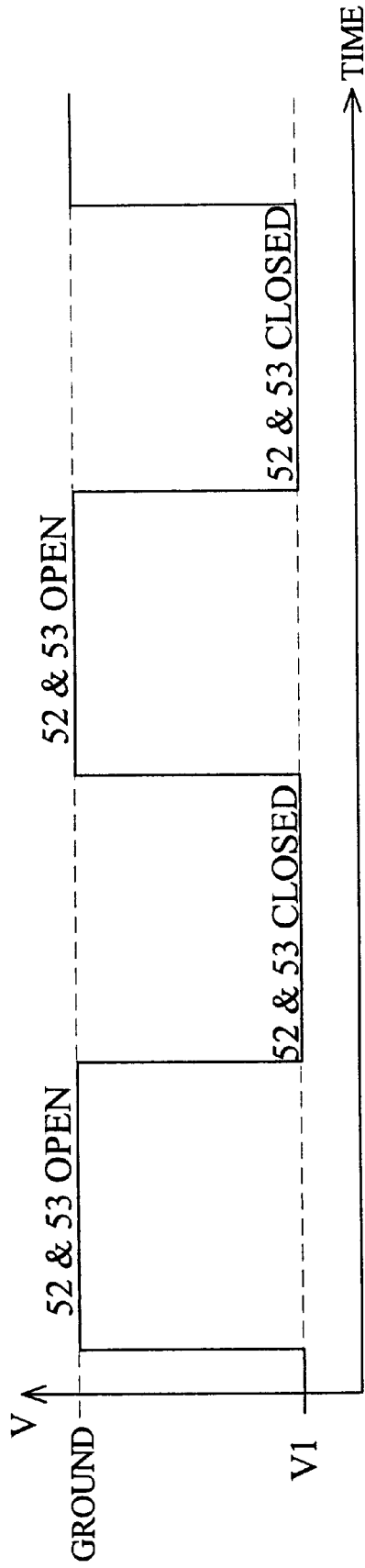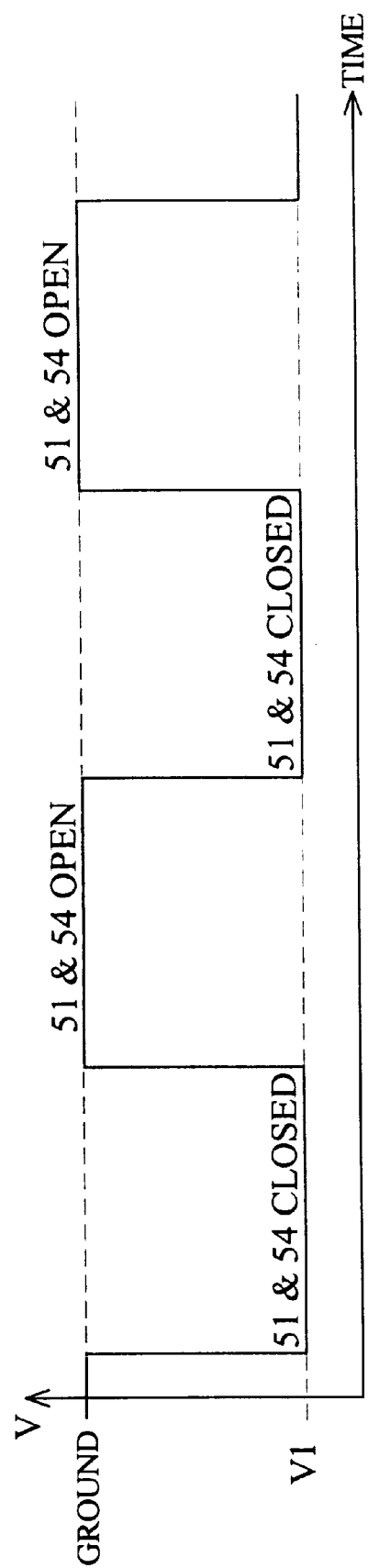

RING GENERATOR

BACKGROUND OF THE INVENTION

This invention relates to telecommunication, and more particularly to a telephone system ring generator.

In conventional local loop systems, a central office communicates with wire-line subscribers (e.g., telephones) through subscriber loop interface circuits located in the central office. Generally, a ring generator located at the central office rings subscribers. The ring generator applies an alternating voltage of approximately 40–80 volts across subscribers (e.g., telephones).

In the emerging wireless telephone industry, local loop telephone systems face a new of set of requirements. In wireless local loop systems, a base station communicates with a central office through wireless communications. Further, the base station may communicate with both wireless and wire-line subscribers. The base station communications with wire-line subscribers through a corresponding subscriber loop interface circuits located at the base station for each wire-line subscriber. In such systems, having a conventional ring generator is not economically feasible. Further, using a conventional ring generator for a wireless local loop system increases the size and cost of the system and decreases system efficiency.

Prior art solutions have included methods of ringing subscribers through subscriber loop interface circuits. However, conventional subscriber loop interface circuits however are made of integrated semiconductor circuits and are voltage limited. As a result, the prior art solutions do not provide acceptable ring voltage amplitudes, loop length, and power efficiency. Further, a subscriber loop interface circuit having a ring generator on-board may not be able to perform both interface functions and generate a ring voltage.

Accordingly, it is an object of the present invention to overcome the problems of the prior art.

It is another object of the present invention to provide a novel subscriber loop interface circuit having a ring generator.

It is yet another object of the present invention to provide a novel ring generator for wireless local loop systems in which a ring voltage is generated through a subscriber loop interface circuit using semiconductor circuity integrated with the subscriber loop interface circuit.

It is still another object of the present invention to provide a novel wireless local loop system wherein a dedicated circuit for ring voltage generation is integrated with a subscriber loop interface circuit in a voltage limited device.

It is a further object of the present invention to provide a novel method for ringing a subscriber through a subscriber loop interface circuit.

It is yet a further object of the present invention to provide a novel subscriber loop interface circuit having an on board ring generator.

It is still yet a further object of the present invention to provide a novel method that dissipates less power than prior art through subscriber loop interface circuit ringing methods.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIGS. 2a and 2b illustrate the electrical operation of the embodiment illustrated in FIG. 1.

DESCRIPTION OF PREFERRED EMBODIMENTS

Figure 1:
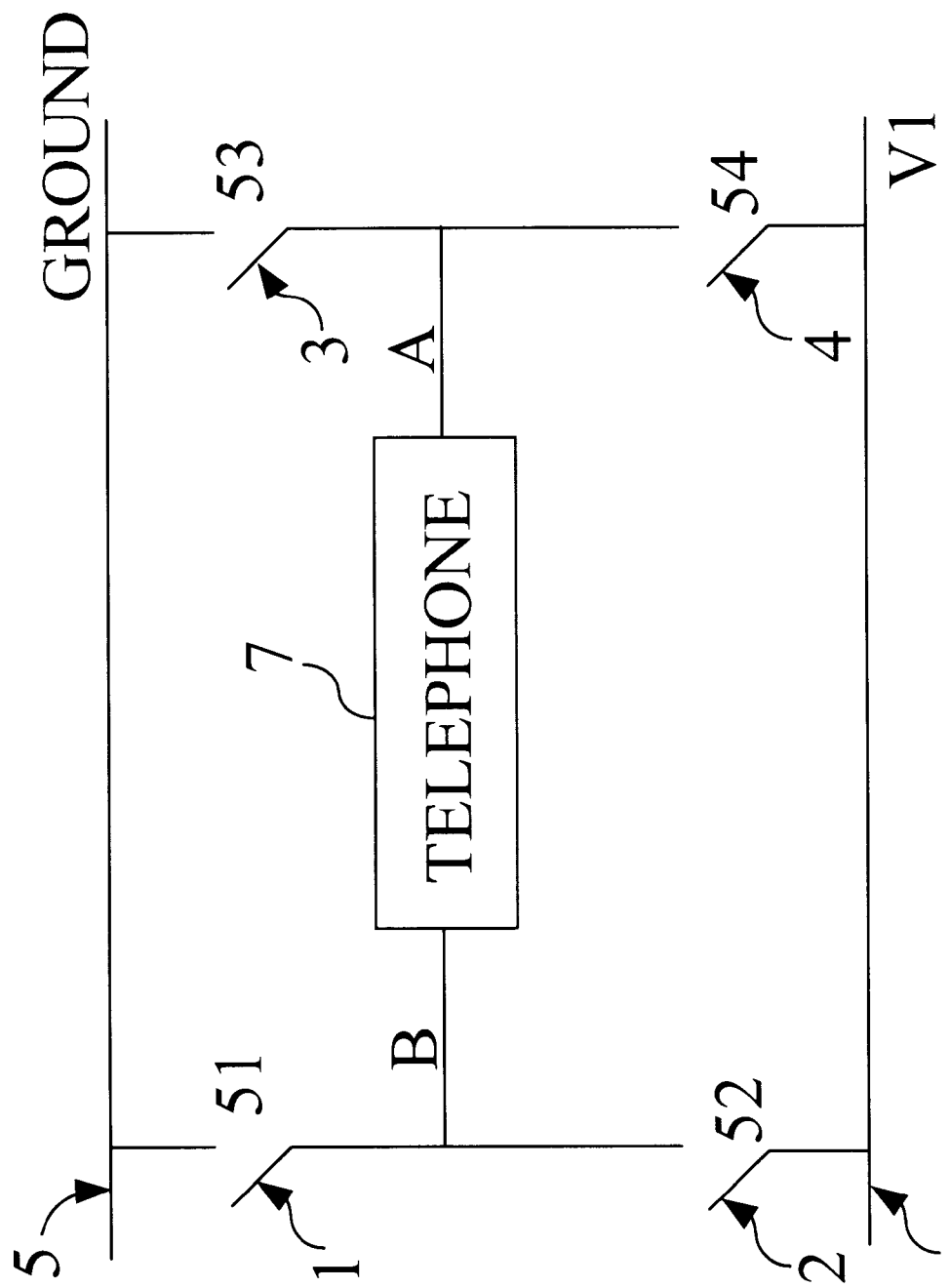
FIG. 1 illustrates an embodiment of the present invention.

FIG. 1 provides a basic illustration of the invention. Four switches 1, 2, 3, and 4 are configured in what is often referred to as a full bridge drive. Switches 1 and 3 have a direct path to line 5 which provides a ground path and switches 2 and 4 have a direct path to line 6 which provides a negative voltage Vbat1.

In operation, the switches are closed in a sequence which causes an alternating voltage to be applied across the telephone 7. FIG. 1 illustrates a telephone only as an example of a subscriber. Initially, switches 1 and 4 are closed (i.e., turned on) at the same time. As a result, a positive voltage is placed across the telephone 7 and current flows from line 5 to line 6 through the telephone 7 and switches 1 and 4. Next, in simultaneous action, switches 1 and 4 are opened and switches 2 and 3 are closed. As a result, the voltage and current across the telephone 7 are reversed. Next, switches 2 and 3 are closed and switches 1 and 4 are opened to repeat the cycle. The switching action is controlled at the frequency required to ring the telephone. The switching action causes the telephone's ringer to charge and discharge which thereby causes the telephone to ring.

FIGS. 2a and 2b illustrate the voltage across the telephone 7 during switching. When switches 1 and 4 are closed and switches 2 and 3 are opened, there is a negative voltage, $V_{AB}$, across the telephone 7. When switches 1 and 4 are opened and switches 2 and 3 are closed, there is a positive voltage, $V_{AB}$, across the telephone 7. The Figures further illustrate the periodic rate of the switching which indicates a ring signal to a telephone.

Figure 3:
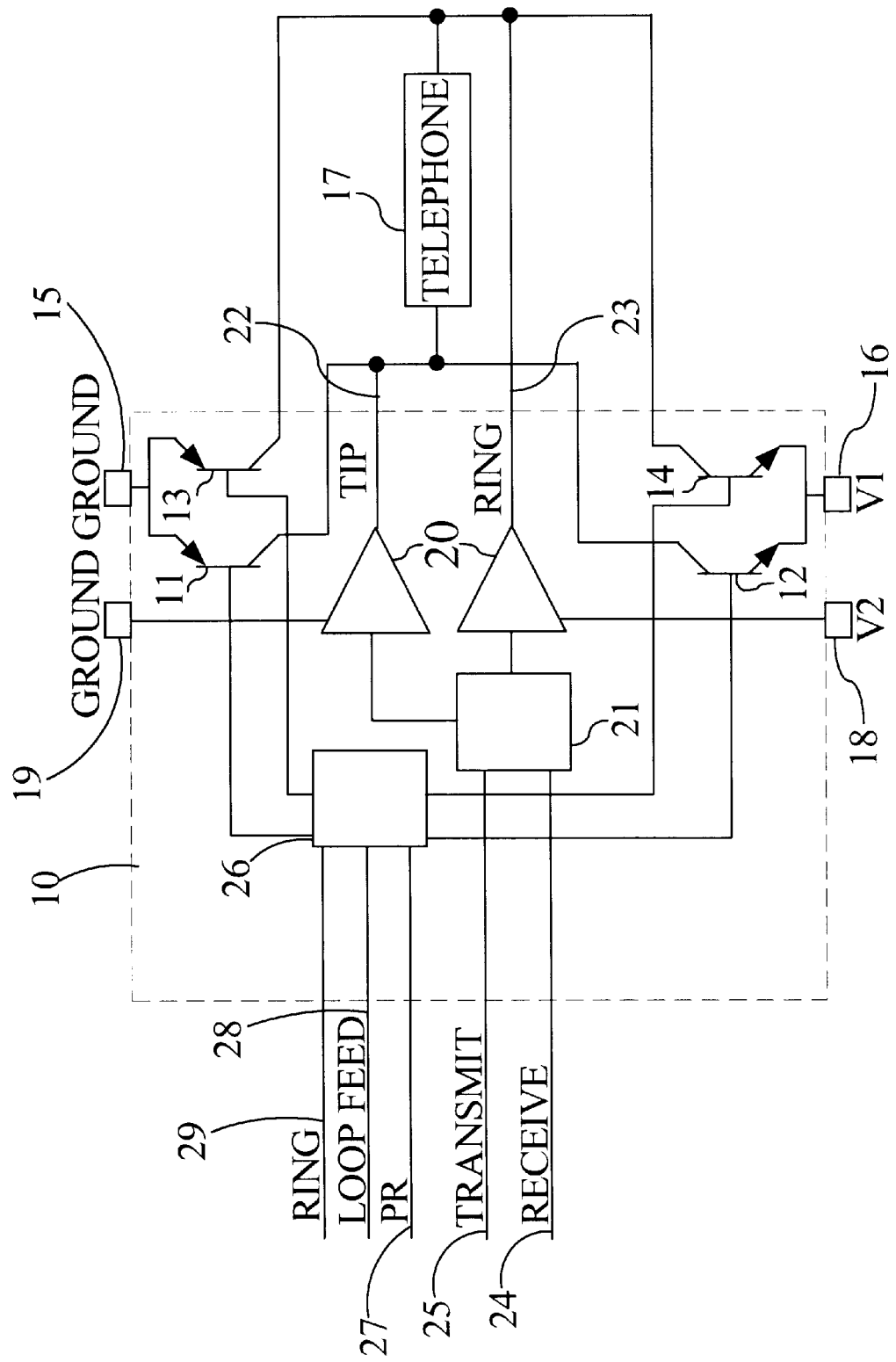
FIG. 3 illustrates an embodiment of the present invention.

FIG. 3 illustrates a circuit implementation of the invention. In FIG. 3, a voltage limited device 10, for example a semiconductor integrated circuit, provides interface and ring generator capability. Amplifiers 20 and analog interface 21 generally provide a communication interface between the telephone 17 and the rest of the local loop system. The telephone 17 may be a voice, data, or other type of subscriber. In application, subscriber-to-subscriber type Communications between the voltage limited device 2 and the telephone 17 are generally achieved on lines 22 (TIP) and 23 (RING). Communications between the voltage limited device 2 and a central office or base station (not shown) are achieved on lines 24, 25, 27, 28, and 29.

The switches 1, 2, 3, and 4 of FIG. 1 correspond to bipolar transistor switches 11, 12, 13, and 14 of FIG. 3, although the switches can be any type of switch element. The low forward voltage drop on the switches 11, 12, 13, and 14 increases the voltage applied during ringing over other through subscriber loop interface circuit methods. In FIG. 3, the collector terminal of switches 11 and 12 is connected to line 22 (TIP) and the collector terminal of switches 13 and 14 is connected to line 23 (RING). As in FIG. 1, the switches are in what is often referred to as full bridge drive configuration. In the embodiment of FIG. 3, the switches are powered from a path 16 separate from path 18 which provides power to the interface circuits. The switches can be connected through path 16 to a voltage source having an amplitude greater than the voltage source connected to path 18. The greater voltage amplitude will provide a greater loop length capability. Further, a separate ground 15 for the switches may increase the voltage range of the ring generator. The seperate ground would be another power supply or battery that is above ground. In application, however, a separate ground would be an unlikely option due to economics.

Generally then, the ring generator and interface circuit of the device 10 are electrically isolated. For example, the amplifiers 20 are independent of the switches 11, 12, 13, and 14 which means that the amplifiers parametric performance is independent of the switches' characteristics. Further, the current limiting or loop drive of the device 10 can be designated independent of ringing voltage or current requirements.

Logic circuit 26 controls the switching by triggering the switches on (closed) or off (opened). Logic circuit 26 initiates the switching action when it receives a ring request. The sequence of switching is the same as discussed above for FIG. 1 where switches 1, 2, 3, and 4 of FIG. 1 correspond to switches 11, 12, 13, and 14 of FIG. 3, respectively. Further, the logic circuit 26 may have internal or external circuitry (not shown) providing the required frequency for generating a ring. The logic circuit 26 also provides an indication of when the ring is answered. Loop Feed 28 is the signals the mode of operation where the subscriber loop interface circuit provides loop current to the telephone 17. Ring 29 signals-the logic mode to turn off amplifiers 20 and 21 and enable or gate switches 11, 12, 13, and 14. PR 27 (Polarity Reversed) signals a subscriber loop interface ciruit operational mode identical to Loop Feed 28 but with Tip 22 and Ring 23 polarity reversed.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a wireless local loop system of the type having a base station for ringing and communicating with wire-line subscribers through a subscriber loop interface circuit for each wire-line subscriber, the improvement comprising a dedicated circuit integrated with each subscriber loop interface circuit on a voltage limited device for generating a ring signal upon activation, said dedicated circuit comprising:
    a first switching means operatively connected between a first voltage source and a first terminal of a subscriber;
    a second switching means operatively connected between a second voltage source and said first terminal of said subscriber;
    a third switching means operatively connected between said first voltage source and a second terminal of said subscriber; and
    a fourth switching means operatively connected between said second voltage source and said second terminal of said subscriber;
    wherein said first and said second switching means are operated simultaneously and said second and said third switching means are operated simultaneously so that said ring signal is generated by alternately opening said first and said fourth switching means while closing said second and said third switching means and closing said first and said fourth switching means while opening said second and said third switching means.

2. The wireless local loop system of claim 1 wherein the dedicated circuit and the subscriber loop interface circuit are powered from separate paths.

3. The wireless local loop system of claim 2 wherein the dedicated circuit and the subscriber loop interface circuit are connected to separate ground terminals.

4. The wireless local loop system of claim 2 wherein each of the separate paths connects to a constant voltage source of differing amplitude.

5. The wireless local loop system of claim 4 wherein the amplitude of the constant voltage source connected to the dedicated circuit is equivalent to or greater than the ring voltage amplitude of the subscriber.

6. The wireless local loop system of claim 4 wherein one of the constant voltage sources comprises a power supply.

7. The wireless local loop system of claim 6 wherein the power supplies comprises a batteries.

8. The wireless local loop system of claim 6 wherein the power supply comprises a programmable power supply.

9. The wireless local loop system of claim 1 wherein the dedicated circuit comprises a set of four or more switches for converting a constant voltage to an alternating voltage for ringing.

10. The wireless local loop system of claim 9 wherein the switches are configured as a full bridge drive.

11. The wireless local loop system of claim 9 wherein the switches are bipolar transistors.

12. The wireless local loop system of claim 9 wherein the switches are semiconductor devices; each semiconductor device having a plurality of terminals.

13. The wireless local loop system of claim 12 wherein the semiconductor devices are metal oxide semiconductor field effect transistors.

14. The wireless local loop system of claim 12 wherein the semiconductor devices are silicon controlled rectifier.

15. An improved subscriber loop interface circuit of the type wherein a ring signal is transmitted through the subscriber loop interface circuit to a corresponding subscriber, the improvement comprising a generator for generating the ring signal on board the subscriber loop interface circuit upon a ring request received at the subscriber loop interface circuit, said generator comprising:
    a first switching means operatively connected between a first voltage source and a first terminal of a subscriber;
    a second switching means operatively connected between a second voltage source and said first terminal of said subscriber;
    a third switching means operatively connected between said first voltage source and a second terminal of said subscriber; and
    a fourth switching means operatively connected between said second voltage source and said second terminal of said subscriber;
    wherein said first and said second switching means are operated simultaneously and said second and said third switching means are operated simultaneously so that said ring signal is generated by alternately opening said first and said fourth switching means while closing said second and said third switching means and closing said first and said fourth switching means while opening said second and said third switching means.

16. The improved subscriber loop interface circuit of claim 15 wherein the subscriber loop interface circuit and the generator comprises a plurality of semiconductor devices integrated in a single package.

17. The improved subscriber loop interface circuit of claim 15 wherein the subscriber loop interface circuit is a voltage limited device.

18. The improved subscriber loop interface circuit of claim 15 wherein the generator and the subscriber loop interface circuit are powered from separate paths.

19. The improved subscriber loop interface circuit of claim 18 wherein the generator and the subscriber loop interface circuit connect to separate ground terminals.

20. The improved subscriber loop interface circuit of claim 18 wherein the separate paths connect to constant voltage sources of different amplitude.

21. The improved subscriber loop interface circuit of claim 20 wherein the amplitude of the constant voltage source connected to the generator is equivalent to or greater than the ring voltage amplitude of the subscriber.

22. The improved subscriber loop interface circuit of claim 21 wherein one of the constant voltage sources comprises a power supply.

23. The wireless local loop system of claim 22 wherein the power supply comprises a battery.

24. The wireless local loop system of claim 22 wherein the power supply comprises a programmable power supply.

25. The improved subscriber loop interface circuit of claim 15 wherein the generator comprises a set of four or more switches for converting a constant voltage to an alternating voltage for ringing the subscriber.

26. The improved subscriber loop interface circuit of claim 25 wherein the transistors are configured as a full bridge drive.

27. The improved subscriber loop interface circuit of claim 25 wherein the switches are bipolar transistors.

28. The improved subscriber loop interface circuit of claim 25 wherein the switches are semiconductor devices; each semiconductor device having a plurality of terminals.

29. The wireless local loop system of claim 28 wherein the semiconductor devices are metal oxide semiconductor field effect transistors.

30. The wireless local loop system of claim 28 wherein the semiconductor devices are silicon controlled rectifiers.

31. A method of ringing a subscriber in a local loop telephone system comprising the steps of:

(a) providing a ring generator;

(b) providing a subscriber loop interface circuit;

(c) integrating the ring generator and subscriber loop interface circuit on a single device;

(d) providing a first switching means operatively connected between a first voltage source and a first terminal of a subscriber;

(e) providing a second switching means operatively connected between a second voltage source and said first terminal of said subscriber;

(f) providing a third switching means operatively connected between said first voltage source and a second terminal of said subscriber; and (g) providing a fourth switching means operatively connected between said second voltage source and said second terminal of said subscriber;

(h) simultaneously operating said first and said second switching means;

(i) simultaneously operating said second and said third switching means (j) generating an alternating ring voltage in the device by alternately opening said first and said fourth switching means while closing said second and said third switching means and closing said first and said fourth switching means while opening said second and said third switching means; and (k) applying the alternating ring voltage across the subscriber.

32. The method of claim 31, wherein the device is a voltage limited.

33. The method of claim 31, wherein the ring generator and subscriber loop interface circuit are electrically isolated.

34. The method of claim 31, wherein the ring generator and subscriber loop interface circuit are powered from isolated paths.

35. The method of claim 31, wherein the ring generator and subscriber loop interface circuit are grounded to different potentials.

36. The method of claim 31, wherein the ring generator and subscriber loop interface circuit are powered by separate power supplies.

37. The method of claim 31, wherein the ring generator comprises a full bridge drive.

38. The method of claim 31, wherein the device is powered by two power supplies having differing voltage amplitudes.

39. The method of claim 38, wherein the two power supplies are batteries.

40. The method of claim 38, wherein the two power supplies are programmable power supplies.

* * * * *